US012811874B2

(12) United States Patent
Roure Vila et al.

(10) Patent No.: US 12,811,874 B2
(45) Date of Patent: Nov. 24, 2026

(54) REGULATING DEVICES BASED ON DATA SOVEREIGNTY AND SUSTAINABILITY

(71) Applicant: Cisco Technology, Inc., San Jose, CA (US)

(72) Inventors: Esther Roure Vila, Alpicat Lleida (ES); Tiziano Canovai, Warsaw (PL); Maria Soledad Palmero Amador, Toledo (ES); Gonzalo A. Salgueiro, Raleigh, NC (US); Pascal Thubert, Roquefort-les-pins (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 548 days.

(21) Appl. No.: 18/344,220

(22) Filed: Jun. 29, 2023

(65) Prior Publication Data

US 2025/0007817 A1 Jan. 2, 2025

(51) Int. Cl.
*H04L 45/12* (2022.01)
*G06Q 30/018* (2023.01)
*H04L 43/028* (2022.01)

(52) U.S. Cl.
CPC ........... *H04L 45/12* (2013.01); *G06Q 30/018* (2013.01); *H04L 43/028* (2013.01)

(58) Field of Classification Search
CPC ...... H04L 45/12; H04L 43/028; G06Q 30/018
See application file for complete search history.

(56) References Cited

U.S. PATENT DOCUMENTS 8,938,777 B1 1/2015 Bharali et al.
11,941,146 B2 * 3/2024 Thubert .............. G06F 9/45558
12,355,867 B2 * 7/2025 Bakshi .................... H04L 9/088
2008/0075007 A1 * 3/2008 Mehta .................. H04W 40/22 370/254
2014/0172513 A1 * 6/2014 MacLean ............ G06Q 30/018 705/7.39

(Continued)

FOREIGN PATENT DOCUMENTS

WO WO-2023214887 A1 * 11/2023 .......... G06F 21/446

OTHER PUBLICATIONS

HKTDC Research, "Introduction of Digital 'Passport' for Products Expected as Part of Ecodesign Reform," https://research.hktdc.com/en/article/MTAxMjg3MDUwMQ, Mar. 18, 2022, 2 pages.

(Continued)

*Primary Examiner* — Angela Widhalm De Rodriguez
(74) *Attorney, Agent, or Firm* — Edell, Shapiro & Finnan, LLC

(57) ABSTRACT

Presented herein are techniques to regulate the use of a device and route network traffic associated with the device based on a digital visa. A method includes obtaining information associated with a device; obtaining information associated with policies for a plurality of jurisdictions, the policies including data sovereignty policies and environmental policies for each jurisdiction of the plurality of jurisdictions; determining a set of constraints for regulating use of the device and for routing network traffic associated with the device based on the information associated with the device and the policies for the plurality of jurisdictions; and regulating the use of the device and routing the network traffic associated with the device based on the set of constraints.

20 Claims, 5 Drawing Sheets

(56) References Cited

U.S. PATENT DOCUMENTS

| | | | | |
|---|---|---|---|---|
| 2014/0188804 | A1 * | 7/2014 | Gokhale | G06F 21/6218 707/645 |
| 2015/0319137 | A1 * | 11/2015 | Krig | H04L 63/10 713/168 |
| 2016/0099969 | A1 | 4/2016 | Angus et al. | |
| 2016/0117525 | A1 | 4/2016 | Arunachalam et al. | |
| 2020/0382519 | A1 * | 12/2020 | Barton | H04L 63/107 |
| 2021/0248252 | A1 * | 8/2021 | Darji | G06F 3/065 |
| 2021/0329001 | A1 | 10/2021 | Barton et al. | |
| 2023/0121250 | A1 * | 4/2023 | Reineke | G06F 9/5094 705/7.37 |
| 2024/0187438 | A1 * | 6/2024 | Hofmann | H04L 63/1425 |

OTHER PUBLICATIONS

Andersson, et al., "Sustainability Insights," draft-almprs-sustainability-insights-00, Active Internet-Draft, https://datatracker.ietf.org/doc/draft-almprs-sustainability-insights/, Mar. 13, 2023, 12 pages.

Digitaleurope, "Digital Product Passport (CIRPASS)," retrieved from https://www.digitaleurope.org/digital-product-passport/, on May 16, 2023, 3 pages.

* cited by examiner

200

| | |
|---|---|
| DEVICE IDENTIFIER | aaa |
| NUMBER OF RE-USES | N |
| JURISDICTION OF MANUFACTURE | x |
| JURISDICTION OF IMPORT | y |
| JURISDICTIONS IN USE | A B ●●● N |
| JURISDICTION PASSPORT | ●●● |
| JURISDICTION VISAS | ●●● |
| JURISDICTION RESTRICTIONS | ●●● |
| JURISDICTION LEGISLATION TYPE | ●●● |
| JURISDICTION ENERGY LIMITATIONS | ●●● |
| JURISDICTION DC PUE LIMITATION | ●●● |

FIG.2

REGULATING DEVICES BASED ON DATA SOVEREIGNTY AND SUSTAINABILITY

TECHNICAL FIELD

The present disclosure relates to regulating devices and network traffic based on data sovereignty and sustainability.

BACKGROUND

Data sovereignty, energy efficiency, and sustainability are important for companies and governments. Policies are being developed that not only mandate the use of the Information and Communication Technology (ICT) infrastructure, but also regulate the use of data and resources. Currently, there is no mechanism to provision and enforce the legislation based on the country or jurisdiction where the device is located, where the device has previously been located, where virtual applications associated with the device are running, or where the network traffic associated with the device has been transmitted or will be transmitted.

BRIEF DESCRIPTION OF THE DRAWINGS

FIG. 2 is an example table illustrating data that may be included in a visa for a device, according to an example embodiment.

DESCRIPTION OF EMBODIMENTS

Overview

Figure 1:
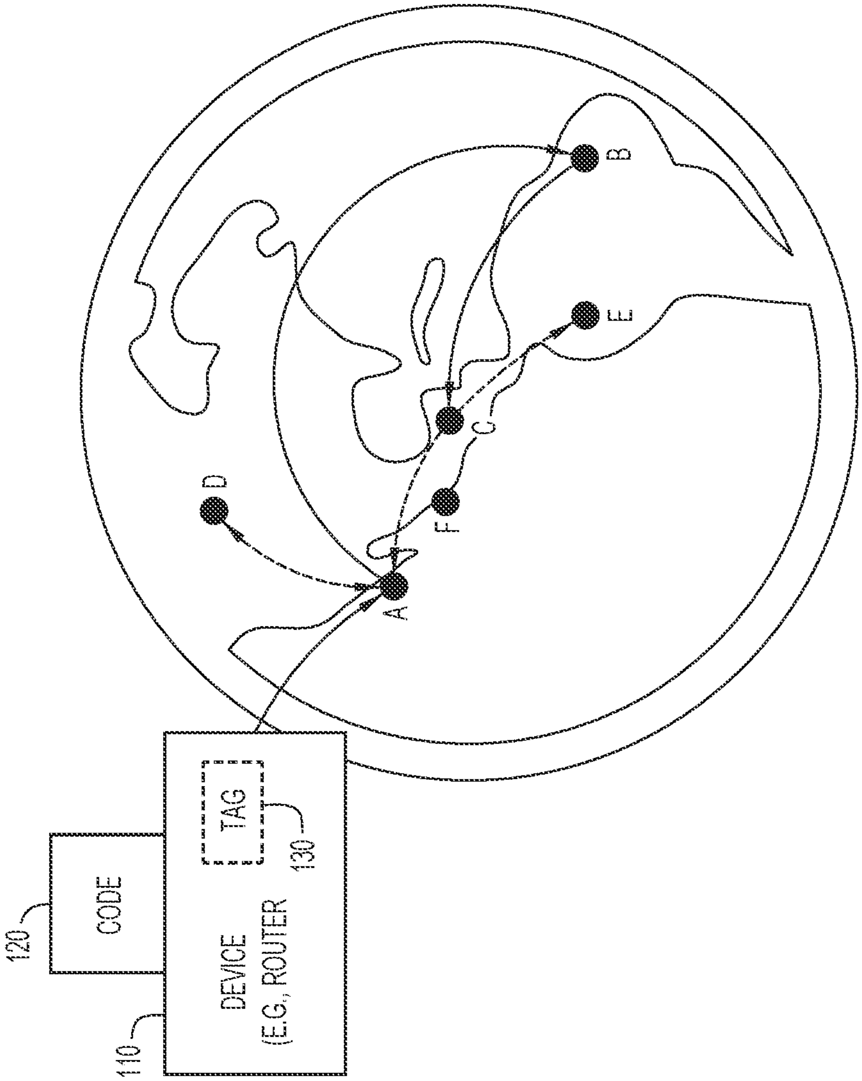
FIG. 1 is an example environment of a device with an embedded code that may move to different locations, according to an example embodiment.

Presented herein are techniques to regulate the use of a device and network traffic associated with the device based on information associated with the device and legislation policies associated with jurisdictions. A method includes receiving information associated with a device; obtaining information associated with policies for a plurality of jurisdictions, the policies including data sovereignty policies and environmental policies for each jurisdiction of the plurality of jurisdictions; determining a set of constraints for regulating use of the device and for routing network traffic associated with the device based on the information associated with the device and the policies for the plurality of jurisdictions; and regulating the use of the device and routing the network traffic associated with the device based on the set of constraints Different jurisdictions have different legislation that governs data sovereignty, limits energy consumption of data centers, and provides for sustainability. For example, the European Union (EU) Action Plan for Sustainable Finance will introduce an environmental labeling scheme for data centers to ensure that data centers are energy efficient and sustainable. As another example, Beijing, Shanghai, and Shenzhen have applied strict Power Usage Effectiveness (PUE) rules when approving new data centers, pushing the sector toward greener operations. Currently there is no solution for ensuring a device and network traffic associated with the device meets requirements of the legislation for different jurisdictions based on the location of the device or the path of the network traffic.

Different jurisdictions may be associated with different types of legislation and policies. For example, different jurisdictions may have different legislation or policies for cloud strategies, data classification, security clearance, cloud security, data privacy, data localization, sector-specific security, identification or untrustworthy jurisdictions, security certification and authorization, government data access, registration and licensing of cloud service providers, and other policies.

Cloud strategies are often directed at the public sector, but may also be directed at a wider sector (e.g., critical infrastructure). Plans for migration to a cloud or development of a cloud ecosystem may be limited based on which operational models are appropriate for different datasets/users in different locations (e.g., France, Italy, United Arab Emirates (UAE), EU (Cloud Alliance, Gaia-X)). Data classification policies set out different classes of confidential government data (e.g., United Kingdom (UK) Government Security Classifications Policy). Security clearance laws deal with the vetting of individuals to work in government classified environments or with classified data (e.g., German Security Clearance Act (SUEG)).

Cloud security regulations are often from a cyber authority (e.g., Kingdom of Saudi Arabia (KSA), Cloud Cybersecurity Controls (CCC), and Cloud Computing Regulatory Framework (CCRF)). Data privacy laws generally set rules for international transfer of personal data and related case law/regulatory developments, which may result in de facto localization (e.g., EU's General Data Protection Regulation (GDPR), Brazil's General Personal Data Protection Act (LGDP). Data localization laws define explicit requirements to keep data or an original version of data (e.g., data mirroring) in a particular jurisdiction. Data localization laws may be embedded in data privacy/security laws for certain categories of sensitive/critical data (e.g., Russia's 242-FZ, India's draft digital Personal Data Protection (PDP) bill, China's Cybersecurity Law (CSL), Data Security Law (DSL), and Personal Information Protection Law (PIPL)).

Sector-specific security laws apply especially to telecommunications, the public sector, and critical infrastructure (e.g., UK Telecoms Security Regulations (TSR)). An identification of untrustworthy jurisdictions offers implicit or explicit guidance, often from intelligence or cyber authorities, indicating that data should not be handled in certain jurisdictions. Security certification and authorization schemes usually focus on information security controls, but may also include residency and operational requirements (e.g., ISO 27k, US FedRAMP, EU's European Union Cloud Services (EUCS), France's SecNum Cloud, Japan's Information system Security Management and Assessment Program (ISMAP), Australia's Infosec Registered Assessors Program (IRAP), South Korea's Cloud Security Assurance Program (CSAP)). Government data access is not a sovereign requirement per se, but government-to-government agreements on safeguards can help case tension as they are often a purported root cause especially if unilateral and extraterritorial (e.g., to address concerns relating to US Foreign Intelligence Surveillance Act (FISA) Section 702, US Clarifying Lawful Overseas Use of Data (CLOUD) Act, China's NIL). Registration and licensing of cloud service providers attempts to license cloud providers (like telecommunications providers) to enable regulators to apply controls over such cloud providers targeting local customers (e.g., Malaysia's Cloud Service Provider Licensing proposal, China's data center and cloud licensing regulations).

In some situations, some of the above regulations or other regulations may apply to a device that is in a specific jurisdiction, was in a specific jurisdiction, or will be in a specific jurisdiction. In other situations, the regulations may apply to network traffic traveling through specific jurisdictions or a jurisdiction of virtual applications being run by a device. In some cases, different regulations may apply to a device based on a location of the device or where traffic associated with the device is being transmitted. Currently it may be difficult to ensure that devices and network traffic are adhering to regulations associated with and enforced by different jurisdictions since the regulations may change based on a number of factors (e.g., location of the device, location of network traffic, changes to regulations, etc.).

Embodiments described herein provide a solution that addresses and aligns jurisdiction legislation to the supply chain and uses phase constraints based on data sovereignty and sustainability. As used herein, the term jurisdiction includes a city, state, province, country, or region consisting of multiple countries (such as the EU). Embodiments described herein provide for a "visa" or a "data passport visa" that outlines a set of rules or constraints for regulating devices or network traffic associated with devices to guarantee adherence to jurisdiction-specific legislation policies based on data sovereignty, energy efficiency, energy sources, sustainability, and other factors.

In some embodiments, the visa may be associated with a Digital Product Passport (DPP) for a device and may use information provided by the DPP to guarantee adherence to the legislation. DPPs gather data on a product and the supply chain associated with the product to provide a better understanding of the materials and products used during production of the product and their embodied environmental impact. The digital product passports initiative is part of the proposed Ecodesign for Sustainable Products Regulation and one of the key actions under the Circular Economy Action Plan (CEAP). According to some embodiments, the data passport visa may add additional data to the data acquired from the DPP to develop rules and constraints for regulating devices and network traffic.

In some embodiments, the location of a device may be determined using a location server that provides offline verification of equipment roaming and tampering. The location server may identify the location of the device and current regulations associated with the location may be identified. Constraints for the device or network traffic associated with the device may be determined based on the location and information in the visa.

EXAMPLE EMBODIMENTS

FIG. 1 shows a device 110, such as a networking device, router, etc., and a code 120 associated, affixed, embedded, or integrated with the device 110, and which is transported geographically along with the device 110, according to an example embodiment. The code 120 may be, for example, a Quick Response (QR) code, a Uniform Resource Locator (URL) or another type of code that, when scanned, links to information associated with the device 110. For example, code 120 may be scanned to determine visa and/or DPP information associated with the device. The information linked to by the code 120 may dynamically change. For example, the information may change based on a location of the device 110, based on updated regulations for different jurisdictions, etc. Device 110 may additionally and optionally include tag 130. Tag 130 may operate to geographically track device 110 as device 110 is transported in an unpowered state.

In one embodiment, tag 130 may comprise a battery powered radio frequency (RF) receiver module configured to receive cellular long-term evolution (LTE) transmissions or broadcasts. Tag 130 may also be configured to receive other RF based protocols such as wireless local area network (LAN) (e.g., Wi-Fi) broadcasts and Automatic Dependent Surveillance-Broadcast (ADS-B) beacon broadcasts. Tag 130 may be associated, affixed, or integrated within a chassis of device 110, a line card of device 110 or any other hardware associated with device 110 that would benefit from transit surveillance. Tag 130 may comprise a battery, an interface to device 110 that may include a wired or wireless connection, event/trigger logic stored within memory, an accelerometer, a temperature sensor, an air pressure sensor, tamper switch, and a RF receiver.

As shown by the solid lines in FIG. 1, device 110 may be transported to any one or more authorized or unauthorized regions, countries, jurisdictions, or locations, such as locations A, B, and C. For example, once a purchaser gains access to device 110, the purchaser might transport the device to any number of places, some of which might not be permissible under relevant export regulations. In addition, as shown by the dotted lines in FIG. 1, network traffic associated with device 110 may be transmitted to or received from different locations in different jurisdictions, such as locations D and E. The network traffic transmitted to or received from locations D and E may traverse other jurisdictions. For example, network traffic transmitted to location E may traverse location C. Furthermore, device 110 may be running virtual applications that are in different locations.

Each of locations A, B, C, D, and E may be associated with different legislation policies based on data sovereignty, energy efficiency, sustainability, and other factors. Different legislation policies may need to be enforced for the device or the network traffic based on the locations of the device, the virtual applications, and the network traffic associated with the device. According to embodiments described herein, device 110 may be associated with a digital product visa that uses information associated with the device 110 and policies/legislations associated with different jurisdictions to guarantee the jurisdiction-specific legislation policies are enforced. For example, a jurisdiction at location A might have policies indicating that network traffic can traverse a jurisdiction at location C, but cannot traverse a jurisdiction at location F. Therefore, when device 110 is at location A, the digital product visa associated with device 110 indicates that network traffic associated with device 110 cannot go through devices at location F. Therefore, as illustrated in FIG. 1, network traffic associated with device 110 may be transmitted to location E through a device at location C and not through a device at location F.

Reference is now made to FIG. 2. FIG. 2 is an example table 200 illustrating data that may be included in a visa for device 110. In some embodiments, the digital product visa will add to the data from the DPP. In other embodiments, the DPP information may not be included in the digital product visa information.

As illustrated in FIG. 2, for a device with an identifier of "aaa," the visa may include information associated with the device and jurisdictions where the device is or has been located. For example, the visa may store information associated with the number of re-uses of the device (e.g., 0 if the device is new), the jurisdiction of manufacture, and the jurisdiction of import. The visa may store information associated with the jurisdictions in use, which includes a list of jurisdictions where the device has been installed. This information provides a geo-location history of the device. When a device is no longer in use, the device may be sent to the manufacturer or to another party for recycling or other purposes. In this case, it may be helpful to know the history of where the device has been installed to get an idea of who has used or manipulated the device (e.g., if the device has been installed in a restricted jurisdiction).

The visa may additionally include information indicating which jurisdiction has provided a passport for the device, which jurisdictions are included in the visa for the device, jurisdiction restrictions (i.e., jurisdictions where the device cannot be installed or where network traffic associated with the device cannot traverse), jurisdiction legislation types, jurisdiction energy limitations, jurisdiction data center (DC) PUE limitations, etc. The information illustrated in FIG. 2 is exemplary and additional, different, or less information may be provided in a visa.

As discussed above, in some embodiments, a device's digital product visa may be linked to the device's DPP. Currently, the DPP is not fully defined and implemented. The EU will provide guidelines for implementation and compliance in which every vendor will determine implementation. This fact and flexibility can be seen as a value added for the vendor, covering brand-protection and value-added trusted solutions. There are indications that the DPP will include circular design principles and key performance indicator (KPI) health indicators, including environmental impact attributes representing the lifecycle of products. Circular design principles focus on eliminating waste and pollution, circulating products and materials (at their highest value), and regenerating nature.

In addition, the DPP data may include possible track and trace identifiers such as an economic operator's name/registered trade name, Global Trade Identification Number (or equivalent), an EU Customs Tariff (TARIC) code (or equivalent), global location number (or equivalent), and authorized representative information. When the digital product visa is linked to the DPP, the digital product visa may be an extension of the DPP. In other words, the digital product visa may use the same implementation as DPP, but the digital product visa may extend the value proposition. In the embodiment in which the digital product visa is linked to the DPP for a device, the information included in the DPP may be used in conjunction with the additional visa information to determine rules and constraints associated with the device and network traffic associated with the device.

In some embodiment, when device 110 includes tag 130, a location module may be used to implement a digital product visa. A location tracking server or another controller, which may be located on a customer service cloud or at another location, may be used to implement the functionality on how to manage digital product visa value proposition. The checks to be implemented or dynamic traffic constraints to consider may be done by correlating the information from the digital product visa and country legislation information.

Figure 3:
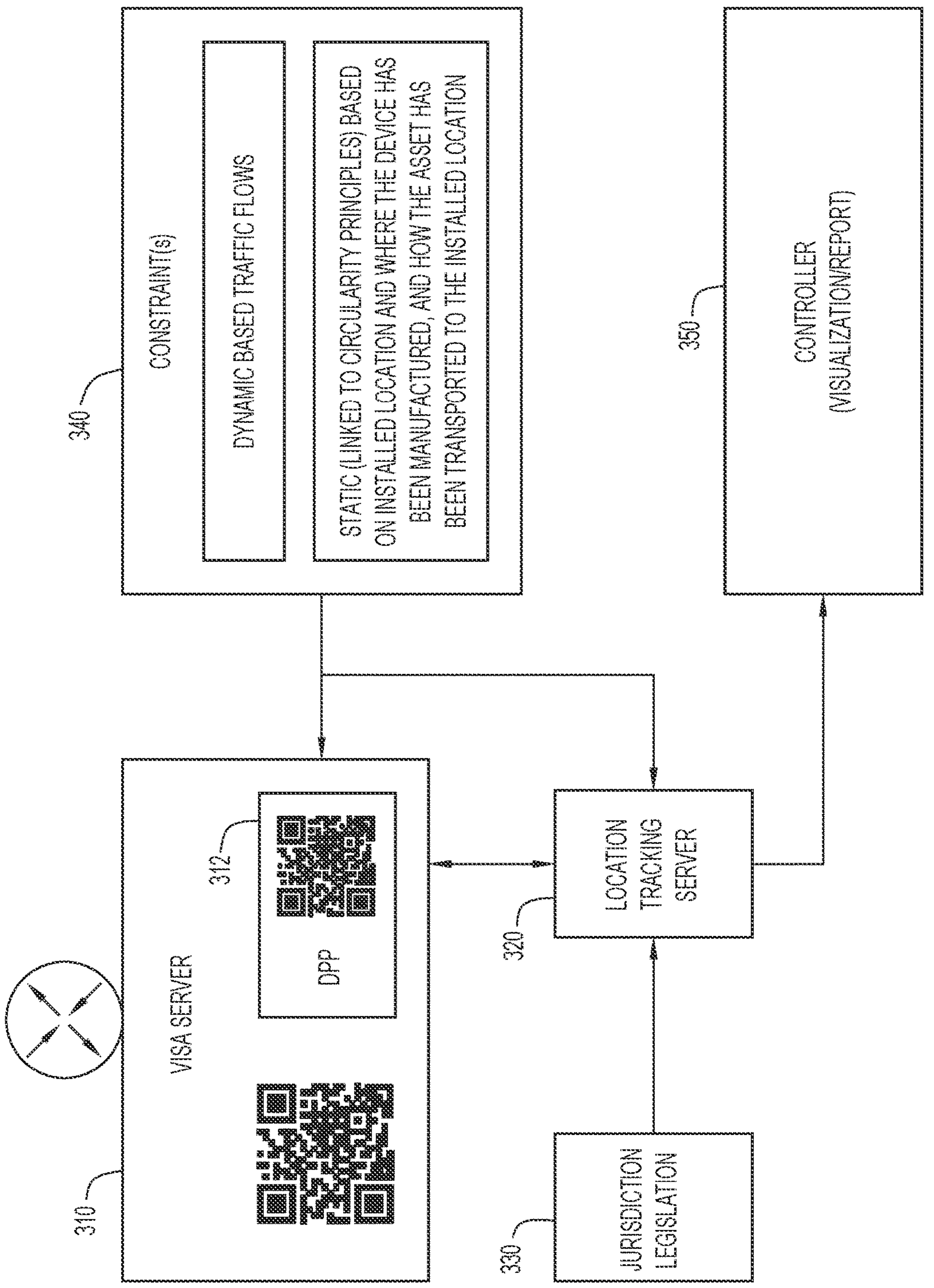
FIG. 3 is an example environment for implementing a digital product visa, according to an example embodiment.

Reference is now made to FIG. 3. FIG. 3 is an example environment for implementing a digital product visa. The example environment includes a digital product visa server 310, location tracking server 320, jurisdiction legislation information 330, constraints 340, and controller 350.

In the example environment illustrated in FIG. 3, location tracking server 320 may aggregate information, such as device and other information from the digital product visa server 310, jurisdiction legislation information 330, and constraints 340, and controller 350 may determine or implement rules or constraints for regulating the device or network traffic associated with the device. In some embodiments, the digital product visa server 310 may be linked to DPP server 312 and the DPP information from DPP server 312 may additionally be aggregated to determine or implement the rules or constraints.

Constraints 340 to apply to the device or the network traffic may be dynamic or static. Dynamic constraints may be based on network traffic flows. For example, a particular jurisdiction may have restrictions on which other jurisdictions traffic associated with a device may flow through when the device is in the particular jurisdiction. In other words, traffic associated with a device may be prohibited from flowing through a restricted jurisdiction. In some embodiments, the traffic may be prohibited from flowing through the restricted jurisdiction when the device is located in a particular jurisdiction with a policy regarding the restricted jurisdiction. In other examples, network traffic may be routed via different routes based on other types of legislation associated with a jurisdiction (e.g., a jurisdiction associated with a location where the device is installed or where a virtual application is run). Static constraints may be linked to circularity principles and may be based on the location in which the device is installed, where the device has been manufactured, and how the device has been transported to the installed location.

In some embodiments, location tracking server 320 or digital product visa server 310 may determine or implement the rules or constraints instead of controller 350. In other embodiments, device 110 may not include a tag 130 to track the location of device 110. In this embodiment, a location of the device 110 may be determined in another way (e.g., the installation location of device 110 may be retrieved from a database) and location tracking server 320 may not be involved in the implementation of the rules or constraints. Instead, the digital product visa server 310 or controller 350 may aggregate the information and determine or implement the policies.

In one embodiment, the information in the digital product visa may be used to identify actions to perform with respect to network traffic. For example, jurisdiction legislation information 330 or digital product visa information may identify restricted jurisdictions through which network traffic is not allowed to flow. In some cases, the jurisdictions are restricted when device 110, a virtual application, or another node are in a particular location or jurisdiction. In this case, the jurisdiction legislation information identifying the restricted jurisdiction may be associated with the particular or jurisdiction. The digital product visa for device 110 may indicate that the network traffic is restricted from flowing through the restricted jurisdiction and, if network traffic flows through the restricted jurisdiction, action should be taken. In this example, if network traffic associated with a device has gone through the restricted jurisdiction, the network traffic will be flagged and sent to a central repository for deep packet inspection and threat identification. If any of the traffic is considered to be a threat, packets may be dropped. Since the digital product visa can change, if the device moves to a new location with different legislation or policies, the jurisdiction may no longer be considered a restricted jurisdiction.

As another example, jurisdiction legislation information 330 or digital product visa information may identify sustainability legislation associated with a location of device 110. For example, jurisdiction-specific legislation associated with the location of device 110 may indicate a threshold for power consumption for hardware associated with the device 110. The digital product visa may indicate actions to take if the power consumption of the hardware goes above the threshold value. For example, if the hardware associated with the device 110 has a power consumption above a threshold level or infringes on sustainability principles from a specific jurisdiction (e.g., the jurisdiction in which the device is installed), a different path for network traffic flow could be chosen in which certain jurisdictions are avoided and which will not alter the integrity of the "green" flow.

This visa could be a permanent visa or a temporary visa that is reviewed regularly (e.g., depending on the type of constraints). Implementation of the digital product visa could be via a network controller and segment routing and added as objectives and constraints. In these examples, the constraints are dynamic (e.g., based on traffic flow). In these examples, jurisdiction legislation policies, circular design principles, and other information from the digital product visa may be aggregated to determine actions to take with regard to the network traffic. By aggregating the device information (e.g., the location of the device), the jurisdiction legislation policies, and environmental policies, a digital product visa for the device may indicate rules or constraints to be placed on the device or network traffic associated with the device to guarantee the jurisdiction-specific legislation policies are followed by the device. Since different jurisdiction-specific legislation policies may be aggregated in different situations (e.g., based on the location of the device, virtual applications associated with the device, etc.), the set of rules or constraints may change to ensure the appropriate legislation-specific policies are being followed.

In another example, a digital product visa may be used to create a "travel advisor." Based on data sovereignty, power consumption, and jurisdiction legislation (e.g., based on a location of a device), a path for certain flows to and from the device can be pre-determined (e.g., across software-defined wide area network hops). In this example, a path may be determined based on security, environmental-impact, and/or legislation policies of different jurisdictions (e.g., the jurisdiction of the device and jurisdictions along the path of the network traffic). The "travel advisor" may be coupled with a traceroute that checks whether the Internet Protocol (IP) path confirms with the travel advisor and all the hops align with data sovereignty policies of different jurisdictions. The location of each hop in the traceroute report may be analyzed and matched with ping times so, for example, anomalies can be detected when a tunnel takes longer than expected. In these this example, the constraints are dynamic (e.g., based on traffic flow) and jurisdiction legislation policies, circular design principles, and other information from the digital product visa may be aggregated to determine the network traffic path.

In another example, a digital product visa may be used to ensure that data from a device is not compromised. For example, the digital product visa may indicate restricted jurisdictions where the device may not be installed. In this example, when a device is booted up in a jurisdiction, digital product visa information may be used to check whether the jurisdiction is restricted. Logic may be included to check the digital product visa information link and determine the jurisdiction visa and jurisdiction legislation type. If the device is in a restricted jurisdiction (e.g., if the device is stolen and moved to a restricted jurisdiction), a data wipe process will start to ensure that the data is not compromised.

Embodiments described herein provide constraints (and assurances) for routing network traffic that take into account jurisdiction legislation conditions and circular design principles. The constraints may be represented on the devices, based on the DPP implementation. The constraints determined based on the digital product visa are not static, are based on circularity, and can change along the lifecycle of the device.

Figure 4:
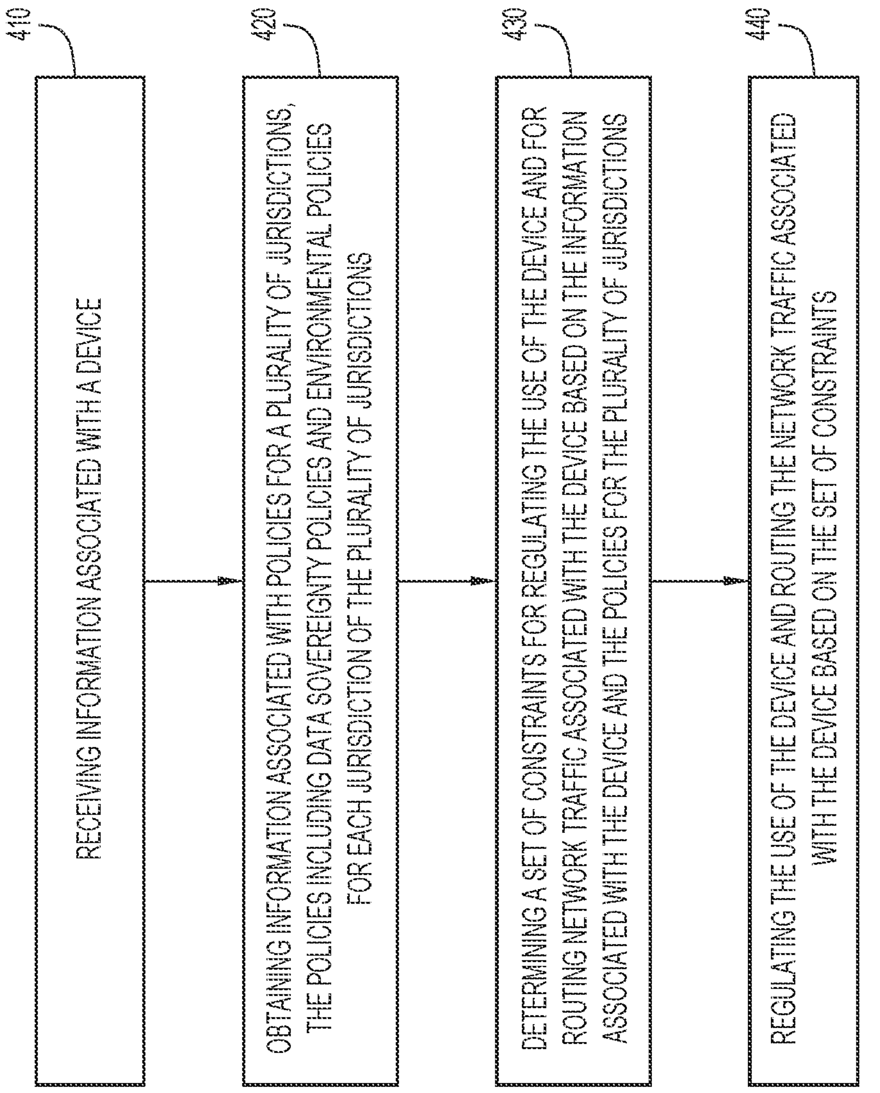
FIG. 4 is a flow chart of illustrating a method for regulating the use of a device and routing network traffic associated with the device based on a digital product visa, according to an example embodiment.

FIG. 4 is a flow chart illustrating a method for regulating the use of a device and routing network traffic associated with the device based on a digital product visa. The method is a computer-implemented method that may be performed by controller 350, location tracking server 320, digital product visa server 310, or another device.

At 410, information about the device is obtained. The information may include, for example, a location of the device, an identifier associated with the device, a type of the device, a jurisdiction of manufacture of the device, a jurisdiction of import, jurisdictions where the device has been in use, a jurisdiction that has provided a digital data passport for the device, jurisdictions associated with a digital data visa for the device, etc. At 420, information associated with policies for a plurality of jurisdictions may be obtained. The policies include data sovereignty policies and environmental policies for each jurisdiction of the plurality of jurisdictions. In some embodiments, the policies may include policies associated with circular design principles, policies associated with jurisdictions that are restricted, jurisdiction energy limitations, jurisdiction data center PUE limitations, etc.

At 430, a set of constraints for regulating the use of the device and for routing network traffic associated with the device are determined based on the information associated with the device and the policies for the plurality of jurisdictions. For example, a digital product visa is determined based on the information associated with the device and the policies for the plurality of jurisdictions to guarantee adherence to jurisdiction-specific policies. The digital product visa may identify, for example, jurisdictions that are restricted for the device or network traffic associated with the device, environmental restrictions associated with a location of the device, etc.

At 440, the use of the device is regulated and the network traffic is routed based on the set of constraints. For example, network traffic associated with the device may be routed to avoid restricted jurisdictions or to comply with environmental policies associated with a location of the device or another location (e.g., a location where traffic is routed, a location of a virtual application, etc.). As another example, data associated with the device may be wiped if the device is booted up in a restricted location.

Figure 5:
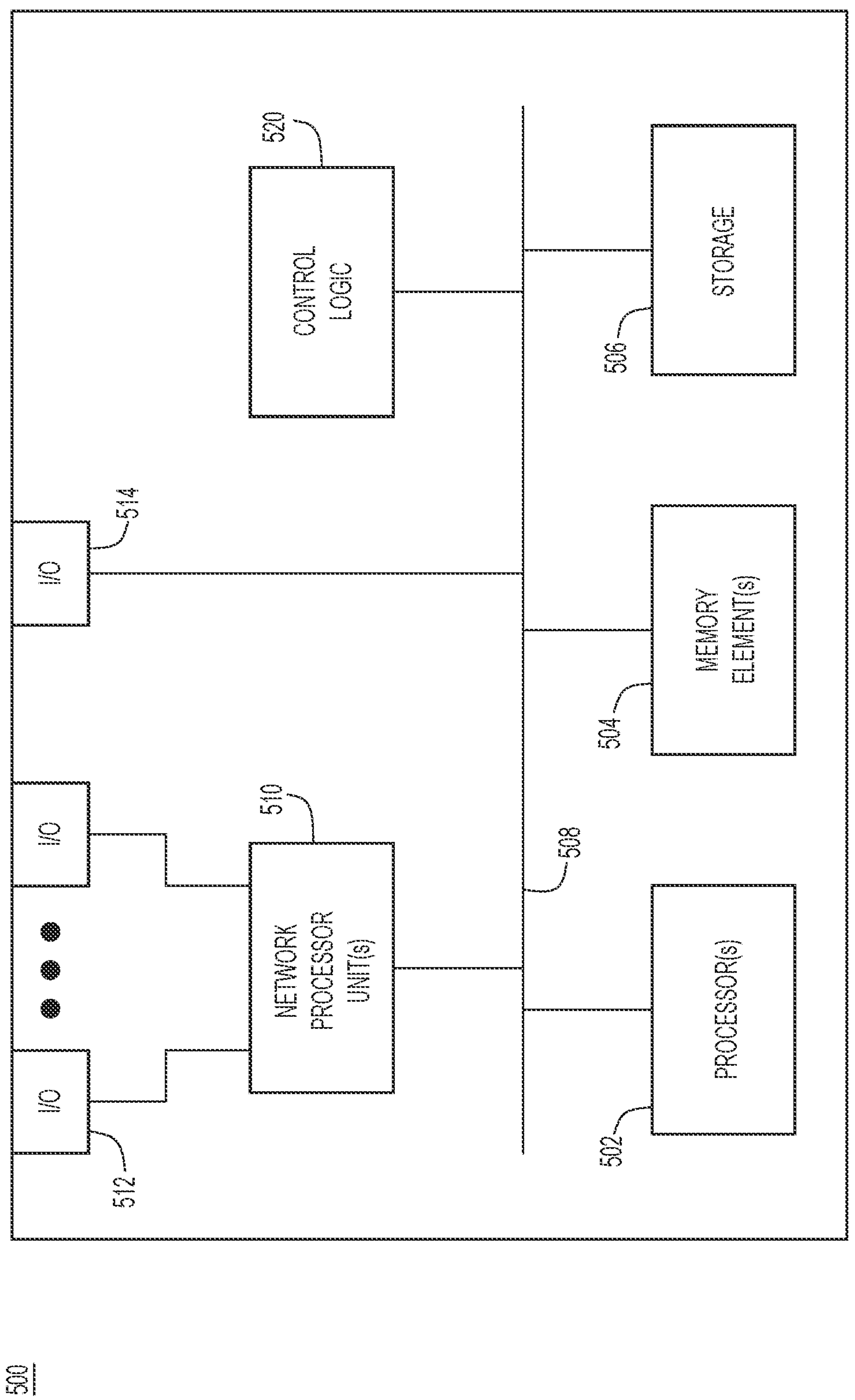
FIG. 5 is a block diagram of a device configured to perform the techniques described herein, according to an example embodiment.

Reference is now made to FIG. 5. FIG. 5 is a block diagram of device that may be configured to operate as device 110, or a device associated with digital product visa server 310, location tracking server 320, controller 350, or another device described herein and perform the techniques described herein, according to an example embodiment.

In various embodiments, a computing device, such as computing device 500 or any combination of computing devices 500, may be configured as any entity/entities as discussed for the techniques depicted in connection with FIGS. 1-4 in order to perform operations of the various techniques discussed herein.

In at least one embodiment, the computing device 500 may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520. In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa) or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 (wired and/or wireless) to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, any other I/O port(s), and/or antenna(s)/antenna array(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to computing device 500. For example, I/O interface(s) 514 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory element(s) 504 and/or storage 506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided including: obtaining information associated with a device; obtaining information associated with policies for a plurality of jurisdictions, the policies including data sovereignty policies and environmental policies for each jurisdiction of the plurality of jurisdictions; determining a set of constraints for regulating use of the device and for routing network traffic associated with the device based on the information associated with the device and the policies for the plurality of jurisdictions; and regulating the use of the device and routing the network traffic associated with the device based on the set of constraints.

In one example, the information associated with the device includes a location of the device. In another example, the method further includes associating a digital visa with the device, wherein the digital visa includes data that describes the set of constraints, and wherein a link to the digital visa is on the device. In another example, the digital visa uses information provided by a Digital Product Passport to enforce the policies.

In another example, regulating the use of the device and routing the network traffic associated with the device includes: identifying that particular network traffic associated with the device has been transmitted through a restricted jurisdiction; and performing packet inspection on the particular network traffic to identify threats or drop packets associated with the particular network traffic. In another example, regulating the use of the device and routing the network traffic associated with the device includes: determining that hardware associated with the device is above a threshold limit on power consumption or infringes sustainability principles for a jurisdiction; and routing the network traffic associated with the device to maintain adherence to the sustainability principles.

In another example, regulating the use of the device and routing the network traffic associated with the device includes: identifying a path for transmitting the network traffic associated with the device based on the policies for the plurality of jurisdictions. In another example, regulating the use of the device and the network traffic associated with the device includes: determining that the device has been booted up in a restricted jurisdiction; and wiping data associated with the device based on determining that the device has been booted up in the restricted jurisdiction. In another example, the set of constraints is updated dynamically based on changes to the information associated with the device or the policies for the plurality of jurisdictions.

In another form, an apparatus is provided including: an interface configured to enable network communications; a memory; and one or more processors coupled to the interface and the memory, and configured to: obtain information associated with a device; obtain information associated with policies for a plurality of jurisdictions, the policies including data sovereignty policies and environmental policies for each jurisdiction of the plurality of jurisdictions; determine a set of constraints for regulating use of the device and for routing network traffic associated with the device based on the information associated with the device and the policies for the plurality of jurisdictions; and regulate the use of the device and route the network traffic associated with the device based on the set of constraints.

In another form, one or more non-transitory computer readable storage media encoded with instructions are provided that, when executed by one or more processors, cause the one or more processors to: obtain information associated with a device; obtain information associated with policies for a plurality of jurisdictions, the policies including data sovereignty policies and environmental policies for each jurisdiction of the plurality of jurisdictions; determine a set of constraints for regulating use of the device and for routing network traffic associated with the device based on the information associated with the device and the policies for the plurality of jurisdictions; and regulate the use of the device and route the network traffic associated with the device based on the set of constraints.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as ‘messages’, ‘messaging’, ‘signaling’, ‘data’, ‘content’, ‘objects’, ‘requests’, ‘queries’, ‘responses’, 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the' (s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method comprising:

obtaining information associated with a device;

obtaining information associated with policies for a plurality of jurisdictions, the policies including data sovereignty policies and environmental policies for each jurisdiction of the plurality of jurisdictions, wherein at least one jurisdiction of the plurality of jurisdictions is associated with a route for network traffic associated with the device;

determining a digital visa associated with the device based on the information associated with the device and the policies for the plurality of jurisdictions, the digital visa indicating a set of constraints for regulating use of the device;

regulating the use of the device based on the set of constraints;

obtaining jurisdiction legislation information associated with one or more of the plurality of jurisdictions;

correlating information contained in the digital visa with the jurisdiction legislation information to determine one or more dynamic traffic constraints associated with network traffic of the device, the one or more dynamic traffic constraints including information indicating whether any jurisdiction of the plurality of jurisdictions is a restricted jurisdiction through which network traffic associated with the device is not allowed to flow;

determining network traffic routing information configured to avoid routing the network traffic associated with the device through the restricted jurisdiction; and routing the network traffic associated with the device based on the network traffic routing information.

2. The computer-implemented method of claim 1, wherein the information associated with the device includes a location of the device.

3. The computer-implemented method of claim 1, wherein the digital visa comprises data that describes the set of constraints, and wherein a link to the digital visa is on the device.

4. The computer-implemented method of claim 3, wherein the digital visa uses information provided by a Digital Product Passport to enforce the policies.

5. The computer-implemented method of claim 1, wherein routing the network traffic associated with the device includes:

identifying that particular network traffic associated with the device has been transmitted through a particular restricted jurisdiction; and performing packet inspection on the particular network traffic to identify threats or drop packets associated with the particular network traffic.

6. The computer-implemented method of claim 1, wherein routing the network traffic associated with the device includes:

determining that hardware associated with the device is above a threshold limit on power consumption or infringes sustainability principles for a jurisdiction; and routing the network traffic associated with the device to maintain adherence to the sustainability principles.

7. The computer-implemented method of claim 1, wherein routing the network traffic associated with the device includes:

identifying a path for transmitting the network traffic associated with the device based on the policies for the plurality of jurisdictions.

8. The computer-implemented method of claim 1, wherein regulating the use of the device includes:

determining that the device has been booted up in a particular restricted jurisdiction; and wiping data associated with the device based on determining that the device has been booted up in the particular restricted jurisdiction.

9. The computer-implemented method of claim 1, wherein the set of constraints is updated dynamically based on changes to the information associated with the device or the policies for the plurality of jurisdictions.

10. An apparatus comprising:

an interface configured to enable network communications;

a memory; and one or more processors coupled to the interface and the memory, and configured to:

obtain information associated with a device;

obtain information associated with policies for a plurality of jurisdictions, the policies including data sovereignty policies and environmental policies for each jurisdiction of the plurality of jurisdictions, wherein at least one jurisdiction of the plurality of jurisdictions is associated with a route for network traffic associated with the device;

determine a digital visa associated with the device based on the information associated with the device and the policies for the plurality of jurisdictions, the digital visa indicating a set of constraints for regulating use of the device;

regulate the use of the device based on the set of constraints;

obtain jurisdiction legislation information associated with one or more of the plurality of jurisdictions;

correlate information contained in the digital visa with the jurisdiction legislation information to determine one or more dynamic traffic constraints associated with network traffic of the device, the one or more dynamic traffic constraints including information indicating whether any jurisdiction of the plurality of jurisdictions is a restricted jurisdiction through which network traffic associated with the device is not allowed to flow;

determine network traffic routing information configured to avoid routing the network traffic associated with the device through the restricted jurisdiction; and route the network traffic associated with the device based on the network traffic routing information.

11. The apparatus of claim 10, wherein the information associated with the device includes a location of the device.

12. The apparatus of claim 10, wherein the digital visa comprises data that describes the set of constraints, and wherein a link to the digital visa is on the device.

13. The apparatus of claim 10, wherein, when routing the network traffic associated with the device, the one or more processors are configured to:

identify that particular network traffic associated with the device has been transmitted through a particular restricted jurisdiction; and perform packet inspection on the particular network traffic to identify threats or drop packets associated with the particular network traffic.

14. The apparatus of claim 10, wherein, when routing the network traffic associated with the device, the one or more processors are configured to:

identify a path for transmitting the network traffic associated with the device based on the policies for the plurality of jurisdictions.

15. The apparatus of claim 10, wherein, when regulating the use of the device, the one or more processors are configured to:

determine that the device has been booted up in a particular restricted jurisdiction; and wipe data associated with the device based on determining that the device has been booted up in the particular restricted jurisdiction.

16. The apparatus of claim 10, wherein the set of constraints is updated dynamically based on changes to the information associated with the device or the policies for the plurality of jurisdictions.

17. One or more non-transitory computer readable storage media encoded with instructions that, when executed by one or more processors, cause the one or more processors to:

obtain information associated with a device;

obtain information associated with policies for a plurality of jurisdictions, the policies including data sovereignty policies and environmental policies for each jurisdiction of the plurality of jurisdictions, wherein at least one jurisdiction of the plurality of jurisdictions is associated with a route for network traffic associated with the device;

determine a digital visa associated with the device based on the information associated with the device and the policies for the plurality of jurisdictions, the digital visa indicating a set of constraints for regulating use of the device based on the information associated with the device and the policies for the plurality of jurisdictions;

regulate the use of the device based on the set of constraints;

obtain jurisdiction legislation information associated with one or more of the plurality of jurisdictions;

correlate information contained in the digital visa with the jurisdiction legislation information to determine one or more dynamic traffic constraints associated with network traffic of the device, the one or more dynamic traffic constraints including information indicating whether any jurisdiction of the plurality of jurisdictions is a restricted jurisdiction through which network traffic associated with the device is not allowed to flow;

determine network traffic routing information configured to avoid routing the network traffic associated with the device through the restricted jurisdiction; and route the network traffic associated with the device based on the network traffic routing information.

18. The one or more non-transitory computer readable storage media of claim 17, wherein the information associated with the device includes a location of the device.

19. The one or more non-transitory computer readable storage media of claim 17, wherein the digital visa comprises data that describes the set of constraints, and wherein a link to the digital visa is on the device.

20. The one or more non-transitory computer readable storage media of claim 17, wherein the set of constraints is updated dynamically based on changes to the information associated with the device or the policies for the plurality of jurisdictions.

* * * * *